(12) United States Patent
Choudhary et al.

(10) Patent No.: US 12,516,251 B2
(45) Date of Patent: Jan. 6, 2026

(54) OXYGEN FIRED FCC REGENERATOR WITH $CO_2$ CAPTURE

(71) Applicants: EXXONMOBIL TECHNOLOGY AND ENGINEERING COMPANY, Annandale, NJ (US); Petrochemical Research Institute, Lanzhou (CN)

(72) Inventors: Vinit Choudhary, Cypress, TX (US); Yosuke Sano, Singapore (SG); Hyung Rae Kim, Basking Ridge, NJ (US); Joseph Famolaro, Spring, TX (US); Masaaki Sugita, The Woodlands, TX (US); Bing Du, Pittstown, NJ (US); Arun Sharma, Hellertown, PA (US); Colin L. Beswick, Lebanon, NJ (US); Hyungsik Lee, Houston, TX (US)

(73) Assignees: EXXONMOBIL TECHNOLOGY AND ENGINEERING COMPANY, Spring, TX (US); Petrochemical Research Institute, Lanzhou (CN)

( * ) Notice: Subject to any disclaimer, the term of this patent is extended or adjusted under 35 U.S.C. 154(b) by 229 days.

(21) Appl. No.: 18/365,559

(22) Filed: Aug. 4, 2023

(65) Prior Publication Data

US 2025/0043195 A1    Feb. 6, 2025

(51) Int. Cl.
*C10G 11/05*    (2006.01)
*B01D 47/10*    (2006.01)
(Continued)

(52) U.S. Cl.
CPC .............. *C10G 11/05* (2013.01); *B01D 47/10* (2013.01); *B01D 53/1475* (2013.01);
(Continued)

(58) Field of Classification Search
CPC ................ D05B 3/02; B01D 2257/302; B01D 2257/404; B01D 2257/504;
(Continued)

(56) References Cited

U.S. PATENT DOCUMENTS 3,702,886 A    11/1972   Argauer
3,709,979 A     1/1973   Chu
(Continued)

FOREIGN PATENT DOCUMENTS

CN    110719949 A    1/2020
EP      229295 A2    7/1987
(Continued)

OTHER PUBLICATIONS

Notice of Allowance received for U.S. Appl. No. 18/091,095, mailed on Jul. 15, 2024, 9 pages.
(Continued)

*Primary Examiner* — Ellen M Mcavoy
*Assistant Examiner* — Chantel Graham
(74) *Attorney, Agent, or Firm* — Shook Hardy & Bacon L.L.P.

(57) ABSTRACT

In various aspects, systems and methods are provided for operating an oxygen-fired catalyst regenerator with flue gas recycle and $CO_2$ capture. An oxygen-fired catalyst regenerator contrasts with an air-fired regenerator. The oxygen-fired catalyst regenerator substantially reduces nitrogen within the system, which facilitates $CO_2$ capture by reducing the energy required to capture $CO_2$. In various aspects, a first portion of the regenerator flue gas is passed to a $CO_2$ capture system and a second portion is recycled to the regenerator. Before the flue gas is recycled or diverted to the $CO_2$ capture, it is passed to various processes that remove and/or reduce $SO_x$, $NO_x$, particulate, and water content. In various (Continued)

aspects, a portion of the treated flue gas may be combined with substantially pure $O_2$ and recycled to the regenerator.

25 Claims, 3 Drawing Sheets

(51) Int. Cl.
| | |
|---|---|
| *B01D 53/14* | (2006.01) |
| *B01D 53/75* | (2006.01) |
| *B01D 53/86* | (2006.01) |
| *B01J 38/14* | (2006.01) |
| *B03C 3/017* | (2006.01) |
| *B03C 3/16* | (2006.01) |

(52) U.S. Cl.
CPC ......... *B01D 53/1481* (2013.01); *B01D 53/75* (2013.01); *B01D 53/8625* (2013.01); *B01J 38/14* (2013.01); *B03C 3/017* (2013.01); *B03C 3/16* (2013.01); *B01D 2257/302* (2013.01); *B01D 2257/404* (2013.01); *B01D 2257/504* (2013.01); *B01D 2258/0283* (2013.01); *C10G 2300/4043* (2013.01); *C10G 2300/4093* (2013.01); *C10G 2300/706* (2013.01); *C10G 2300/708* (2013.01)

(58) Field of Classification Search
CPC ............ B01D 2258/0283; B01D 47/10; B01D 53/1475; B01D 53/1481; B01D 53/75; B01D 53/8625; B01J 38/14; B03C 3/017; B03C 3/16; C10G 11/05; C10G 11/182; C10G 11/185; C10G 2300/4043; C10G 2300/405; C10G 2300/4093; C10G 2300/706; C10G 2300/708
See application file for complete search history.

(56) References Cited

U.S. PATENT DOCUMENTS

| | | | |
|---|---|---|---|
| 3,770,614 | A | 11/1973 | Graven |
| 3,832,449 | A | 8/1974 | Rosinski et al. |
| 3,948,758 | A | 4/1976 | Bonacci et al. |
| 4,016,245 | A | 4/1977 | Plank et al. |
| 4,026,992 | A | 5/1977 | Shiga et al. |
| 4,076,842 | A | 2/1978 | Plank et al. |
| 4,229,424 | A | 10/1980 | Kokotailo |
| 4,254,297 | A | 3/1981 | Frenken et al. |
| 4,310,440 | A | 1/1982 | Wilson et al. |
| 4,440,871 | A | 4/1984 | Lok et al. |
| 4,500,651 | A | 2/1985 | Lok et al. |
| 4,542,114 | A * | 9/1985 | Hegarty ............... F25J 3/04527 502/52 |
| 5,525,317 | A * | 6/1996 | Bhat .................... B01D 53/75 422/177 |
| 8,231,777 | B2 | 7/2012 | Silva et al. |
| 8,753,502 | B1 | 6/2014 | Sexton et al. |
| 10,184,088 | B2 | 1/2019 | Marri et al. |
| 10,870,802 | B2 | 12/2020 | Al-Ghamdi et al. |
| 2007/0140942 | A1 | 6/2007 | Rosen et al. |
| 2011/0269620 | A1 | 11/2011 | Myers et al. |
| 2013/0048915 | A1 | 2/2013 | O'Connor et al. |
| 2015/0284641 | A1 * | 10/2015 | Shi ............................ B01J 8/26 208/113 |
| 2016/0362613 | A1 | 12/2016 | Cunningham et al. |
| 2022/0363998 | A1 | 11/2022 | Diaz et al. |

FOREIGN PATENT DOCUMENTS

| | | |
|---|---|---|
| SG | 10201606610 A1 | 11/2012 |
| SG | 10201606610 Y | 9/2016 |
| WO | 2016200566 A1 | 12/2016 |

OTHER PUBLICATIONS

Notice of Allowance received for U.S. Appl. No. 18/091,127, mailed on Jul. 18, 2024, 10 pages.
Final Office Action received for U.S. Appl. No. 18/091,095, mailed on Jan. 22, 2024, 7 pages.
Final Office Action received for U.S. Appl. No. 18/091,127, mailed on Feb. 1, 2024, 7 pages.
Güleç, F., et al., "Progress in the CO2 Capture Technologies for Fluid Catalytic Cracking (FCC) Units—A Review", Frontiers in Energy Research, vol. 8, Article 62, Frontiers Media SA, pp. 1-14 (Apr. 23, 2020).
Mello, L, F. DE., et al., "A Technical and Economical Evaluation of CO2 Capture From FCC Units", Energy Procedia, vol. 1, No. 1, Elsevier BV, pp. 117-124 (Feb. 2009).
Niccum, P. K., "Diesel Creation in the FCC Centered Refinery", KBR, pp. 1-34 (May 2013).
Non-Final Office Action dated Sep. 1, 2023 in U.S. Appl. No. 18/091,127, 25 pages.
Non-Final Office Action dated Sep. 1, 2023 in U.S. Appl. No. 18/091,095, 25 pages.
International Search Report and Written Opinion received for PCT Patent Application No. PCT/US2023/085378, mailed on Apr. 18, 2024, 13 pages.
International Search Report and Written Opinion received for PCT Patent Application No. PCT/US2023/085379, mailed on Apr. 18, 2024, 13 pages.
International Search Report and Written Opinion received for PCT Patent Application No. PCT/US2024/040008, mailed on Nov. 29, 2024, 17 pages.

* cited by examiner

OXYGEN FIRED FCC REGENERATOR
WITH $CO_2$ CAPTURE

FIELD OF THE INVENTION

Systems and methods are provided for operating an oxygen-fired regeneration processes for fluid catalytic cracking to capture $CO_2$ emissions.

BACKGROUND

Fluid catalytic cracking (FCC) processes are commonly used in refineries as a method for converting feedstocks to produce lower boiling fractions suitable for use as fuels. Typical feedstocks can correspond to vacuum gas oil fractions that typically have acceptably low contaminant metal content and have an overall lower boiling range that is mostly <565° C. Such feedstocks can optionally also include lower boiling fractions already within the fuels boiling range.

Conventionally, FCC reaction systems include a reactor and an associated regenerator. During processing of the feed in the reactor, coke can accumulate on the FCC catalyst. The catalyst is periodically passed into the associated regenerator, where at least a portion of the accumulated coke is removed by combustion. The catalyst is then returned to the reactor to provide the heat for further operation of the reactor. For conventional feeds, the conditions for operating the FCC reactor can often be selected to maximize desirable products such as naphtha, distillate, fuel oil, liquid products, propylene, butylene, iso-butane, and other low and high boiling products. The operating conditions can include factors such as the reaction temperature and the catalyst to oil ratio. Such operating conditions can result in sufficient coke formation that the reactor and regenerator can be in "heat balance", so that the heat for maintaining the FCC reaction at the desired temperature is primarily derived from the heat generated in the regenerator by combustion of the coke formed on the catalyst in the reactor. It is noted that some pre-heating of the feed and/or moderation of the feed temperature can also be performed using heat exchangers and/or furnaces.

FCC reaction systems provide a refinery with a trade-off of advantages and disadvantages. A substantial advantage of FCC processing is the ability to convert higher boiling feedstocks to lower boiling fractions (and in particular fuels boiling range fractions and/or chemicals precursors like propylene and butylenes) without needing to provide hydrogen to the conversion process. However, because coke generated during the FCC process is used to provide the heat needed for maintaining the endothermic cracking process, an FCC reaction system can correspond to up to 50% of the $CO_2$ generated by a refinery.

U.S. Pat. No. 4,542,114 provides an example of an oxygen-fired regenerator with a flue gas recycle loop. Various processes are described that remove and/or reduce $SO_x$, $NO_x$, particulate, and water content from the flue gas prior to recycle to the regenerator. The '114 patent also describes extracting $CO_2$ from the recycled flue gas.

The Mello paper (Mello, Leonardo F. de, et al. "A Technical and Economical Evaluation of CO2 Capture From FCC Units." *Energy Procedia*, vol. 1, no. 1, Elsevier B V, February 2009, pp. 117-24. https://doi.org/10.1016/j.egypro.2009.01.018.) provides an example of an oxygen fired FCC with $CO_2$ recycle and capture. Various processes are described that remove and/or reduce $SO_x$, $NO_x$, particulate, and water content from the flue gas prior to recycle to the regenerator.

The Güleç paper (Güleç, Fatih, et al. "Progress in the $CO_2$ Capture Technologies for Fluid Catalytic Cracking (FCC) Units—A Review." *Frontiers in Energy Research*, vol. 8, Frontiers Media SA, April 2020, https://doi.org/10.3389/fenrg.2020.00062.) provides another example of an oxygen fired FCC with $CO_2$ recycle and capture. Various processes are described that remove and/or reduce $SO_x$, $NO_x$, particulate, and water content from the flue gas prior to recycle to the regenerator. The Güleç paper notes that the capital cost of building an oxy-fired FCC unit may be 1.5 times the cost of an air-fired unit.

It would be desirable to have improved methods of operating an FCC process that can mitigate the $CO_2$ impact on a refinery. Additionally or alternately, it would be desirable to have methods for forming FCC products while reducing or minimizing $CO_2$ production.

SUMMARY

In various aspects, systems and methods are provided for operating an FCC reaction and regeneration system while also reducing or minimizing the net environmental $CO_2$ emissions associated with the FCC reaction system and/or the resulting FCC products. In some aspects, reducing or minimizing net environmental $CO_2$ emissions can be achieved by using an oxygen-fired catalyst regenerator with flue gas recycle and $CO_2$ capture. An oxygen-fired catalyst regenerator contrasts with an air-fired regenerator. The oxygen-fired catalyst regenerator substantially reduces nitrogen within the system, which facilitates $CO_2$ capture by reducing the energy required to capture $CO_2$.

In an aspect of the technology described herein, a method for operating a regenerator for a fluid catalytic cracking reaction system is provided. The method comprises exposing a hydrocarbonaceous feed to a catalyst in a reactor under fluid catalytic cracking conditions to form one or more gasoline products and coke associated with the catalyst. The method also comprises passing at least a portion of the catalyst and the associated coke into a regenerator and passing a gas comprising CO2 and O2 to the regenerator, wherein the CO2 content in the gas is greater than 50% by vol %. The method also comprises combusting at least a portion of the associated coke and at least a portion of the substantially pure O2 to form at least heated catalyst and flue gas. The method also comprises passing the flue gas to a wet gas scrubber to substantially remove SOx and cool the flue gas and form a reduced particulate flue gas. The method also comprises passing the reduced particulate flue gas to a wet electrostatic precipitator to form a low particulate flue gas. The method also comprises passing a first portion of the low particulate flue gas to a CO2 capture system. The method also comprises passing a second portion of the low particulate flue gas to the regenerator as a recycled CO2 content. The method also comprises passing at least a portion of the heated catalyst into the reactor.

In an aspect of the technology described herein, a method for operating a regenerator for a fluid catalytic cracking reaction system is provided. The method comprises exposing a hydrocarbonaceous feed to a catalyst in a reactor under fluid catalytic cracking conditions to form one or more gasoline products and coke associated with the catalyst. The method also comprises passing at least a portion of the catalyst and the associated coke into a regenerator and passing a gas comprising CO2 and O2 to the regenerator, wherein the CO2 content in the gas is greater than 50% by vol %. The method also comprises combusting at least a portion of the associated coke with at least a portion of the substantially pure O2 to form at least heated catalyst and flue gas and passing the flue gas to a CO boiler. The method also comprises, subsequent to the flue gas exiting the CO boiler, passing the flue gas to a wet gas scrubber to substantially remove SOx and to form a reduced particulate flue gas. The method further comprises passing a first portion of the reduced particulate flue gas to a recycle loop that includes a knock out drum and feeds into the CO boiler. The method further comprises passing a second portion of the reduced particulate flue gas to a wet electrostatic precipitator to form a low particulate flue gas. The method further comprises passing a first portion of the low particulate flue gas to a CO2 capture system. The method further comprises passing a second portion of the low particulate flue gas to the regenerator as a recycled CO2 content. The method further comprises passing at least a portion of the heated catalyst into the reactor.

In an aspect of the technology described herein, a method for operating a regenerator for a fluid catalytic cracking reaction system is provided. The method comprises exposing a hydrocarbonaceous feed to a catalyst in a reactor under fluid catalytic cracking conditions to form one or more liquid products and coke associated with the catalyst. The method also comprises passing at least a portion of the catalyst and the associated coke into a regenerator and passing a gas comprising CO2 and O2 to the regenerator. The CO2 content in the gas may be greater than 50% by vol % and a nitrogen content is less than 20%. The method further comprises combusting at least a portion of the associated coke with the combustion gas to form at least heated catalyst and flue gas and passing the flue gas to a wet gas scrubber to form a reduced particulate flue gas. The method further comprises passing a scrubbing liquid used in the wet gas scrubber through a cooler. The method further comprises passing the reduced particulate flue gas to a wet electrostatic precipitator to form a low particulate flue gas and passing a first portion of the low particulate flue gas to a CO2 capture system. The method further comprises passing a second portion of the low particulate flue gas to the regenerator as a second recycled CO2 content. The method further comprises passing a third portion of the low particulate flue gas into a CO boiler and passing at least a portion of the heated catalyst into the reactor.

DETAILED DESCRIPTION

Figure 1:
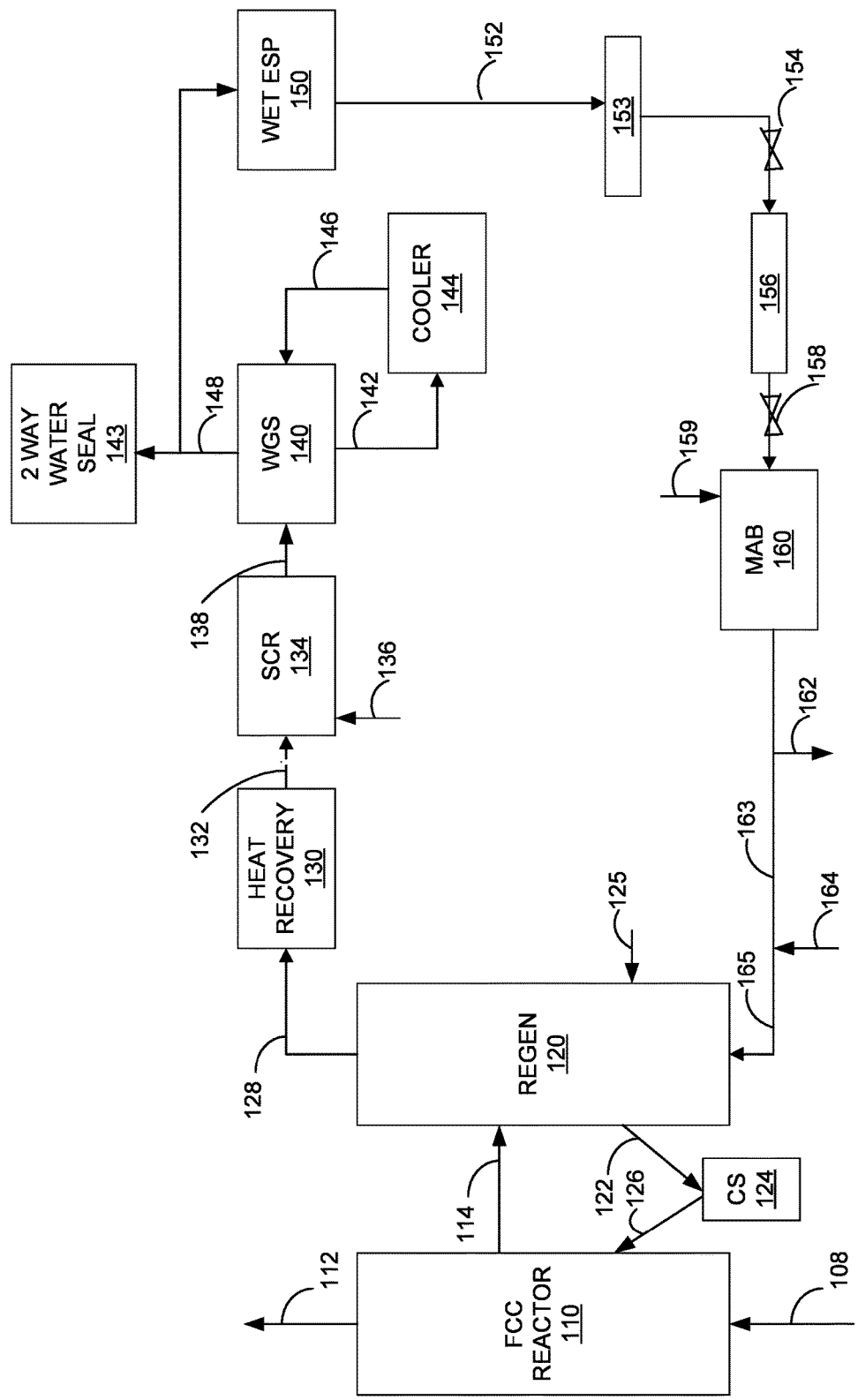
FIG. 1 shows an example of an oxygen-fired FCC regeneration system with a flue gas recycle loop, according to an aspect of the technology described herein.

All numerical values within the detailed description and the claims herein are modified by "about" or "approximately" the indicated value, and take into account experimental error and variations that would be expected by a person having ordinary skill in the art.

Overview

In various aspects, systems and methods are provided for operating an FCC reaction and regeneration system while also reducing or minimizing the net environmental $CO_2$ emissions associated with the FCC reaction system and/or the resulting FCC products. In some aspects, reducing or minimizing net environmental $CO_2$ emissions can be achieved by using an oxygen-fired catalyst regenerator with flue gas recycle and $CO_2$ capture. An oxygen-fired catalyst regenerator contrasts with an air-fired regenerator. The oxygen-fired catalyst regenerator substantially reduces $N_2$ within the system, which facilitates $CO_2$ capture by reducing the energy required to capture $CO_2$.

Conventionally, air is used as a source of oxygen in the regenerator to combust coke. The air comprises approximately 78% nitrogen, which primarily passes into the regenerator flue gas along with $O_2$, CO, $CO_2$, $H_2O$ and other combustion by-products (e.g., $SO_x$ and $NO_x$). Conventionally, the flue gas exiting the regenerator is passed through one or more heat recovery operations, one or more environmental compliance operations, and then emitted to the atmosphere. The high concentration of nitrogen (e.g., approximately 80% by volume) and comparatively low concentration of $CO_2$ (e.g., approximately 15% by volume) in the flue gas makes separating $CO_2$ from the flue gas an energy intensive operation.

In various aspects, the energy intensity of $CO_2$ capture from the flue gas is reduced by substantially eliminating nitrogen from the regeneration system. Nitrogen is substantially eliminated from the regeneration system by feeding substantially pure $O_2$ to the regenerator, rather than air. In aspects, the substantially pure $O_2$ is combined with recycled $CO_2$ and non-combusted $O_2$ to form an inlet gas for the regenerator. In various aspects, when the inlet air is replaced with substantially pure $O_2$ and recycled flue gas the regenerator flue gas primarily comprises $O_2$, CO, $CO_2$, $H_2O$ and other combustion by-products (e.g., $SO_x$ and $NO_x$) with a nitrogen content of less than 5% by vol %. With the oxygen-fired regenerator, the $CO_2$ concentration in the regenerator flue gas may be greater than 70% by vol %. More or less CO may be generated depending on the selected burn mode in the regenerator. In full burn mode, the flue gas will include excess $O_2$, such that $O_2$ in the regenerator flue gas is greater than 0.3% vol %, or greater than 0.5% vol %. In partial burn mode, the regenerator flue gas will have CO, such as greater than 1%, such as greater than 3%, such as greater than 5%.

In various aspects, a first portion of the flue gas is passed to a $CO_2$ capture system and a second portion is recycled to the regenerator. Before the flue gas is recycled or diverted to the $CO_2$ capture, it is passed to various processes that remove and/or reduce $SO_x$, $NO_x$, particulate, and water content. The temperature of the flue gas may be reduced through a heat recovery system. The $NO_x$ can be removed by a SCR or other thermal denoxing, the $SO_x$ can be removed by a wet gas scrubber, which also reduces particulate content. Additional particulate and any acid mist that may be present in the flue gas may be removed with an electrostatic precipitator downstream of the wet gas scrubber.

In various aspects, the flue gas is cooled to reduce moisture content prior to being recycled into the regenerator. A high moisture content in the recycled flue gas may cause catalyst deactivation due to a hydrotherming effect. In an aspect, a cooler is added to a liquid recycle loop in a wet gas scrubber used to treat the flue gas. Other methods of cooling the flue gas are possible. In aspects, the flue gas is cooled to achieve a moisture content of 25% vol % or less, 20% vol % or less, or 15% vol % or less, or 7% vol % or less, such as down to 3% vol %.

In various aspects, a portion of the treated flue gas may be combined with substantially pure $O_2$ and passed to the regenerator. In aspects, the combination of substantially pure $O_2$ and recycled flue gas may result in a regenerator inlet gas comprising 50% by vol % $CO_2$ or more, or 65% vol % or more, or 70% vol % or more, such as up to 80% vol %. Correspondingly, in aspects, the combination of substantially pure $O_2$ in the recycled flue gas may result in a regenerator inlet gas comprising 10% by vol % $O_2$ or more, or 20% by vol % $O_2$ or more, or 25% vol % or more, or 30% vol % or more, such as up to 40% vol %. If the $O_2$ level is greater than 30%, then additional temperature control may be used. A catalyst cooler is one example of a suitable temperature control.

Recycling $CO_2$ to the regenerator serves several purposes. First, the $CO_2$ replaces nitrogen as a heat transfer medium to regulate the temperature in the regenerator. Secondly, the $CO_2$ helps regulate the $O_2$ level in the regenerator into a desirable operation condition. A higher than optimal $O_2$ level can cause high local temperatures, which can threaten the mechanical integrity of regenerator components. The $CO_2$ is used to maintain $O_2$ level within a range that avoids undesirably high temperatures (which can vary depending on material of construction). In addition, a certain volumetric flow rate of gas is required to maintain a correct amount of fluidization and mixing of catalyst in the regenerator. The $CO_2$ may comprise a majority of the volumetric flow.

Definitions-General

In this discussion, "biomass oil" is defined as any conversion products from a biomass conversion process that would be liquid phase at 40° C. and 100 kPa-a. It is noted that while most biomass oils are liquid phase at ambient conditions (e.g., 20° C. and 100 kPa-a), some biomass oils can set to form a wax at 20° C., and require modest amounts of heating if used in a system operated at ambient conditions. It is further noted that biomass oil has a boiling range that is broader than the boiling range for a vacuum gas oil that would typically be used as an FCC feed.

As defined herein, the term "hydrocarbonaceous" includes compositions or fractions that contain hydrocarbons and hydrocarbon-like compounds that may contain heteroatoms typically found in petroleum or renewable oil fraction and/or that may be typically introduced during conventional processing of a petroleum fraction. Heteroatoms typically found in petroleum or renewable oil fractions include, but are not limited to, sulfur, nitrogen, phosphorous, and oxygen. Other types of atoms different from carbon and hydrogen that may be present in a hydrocarbonaceous fraction or composition can include alkali metals as well as trace transition metals (such as Ni, V, Ca, or Fe).

In this discussion, unless otherwise specified, the feed to the FCC reactor refers to the hydrocarbonaceous compounds introduced into the reactor. Any diluents such as $N_2$ that may be present are considered additional components, and not considered as part of the feed. It is noted that some types of biomass oils can include a substantial water content. Unless otherwise noted, such water is not considered part of the feed.

In this discussion, conversion of a feed within an FCC reactor is defined based on the amount of feed that is converted relative to a conversion temperature. In some aspects, it can be convenient to define conversion relative to 430° F. (221° C.), which corresponds to the temperature for converting heavier components (221° C.+) to naphtha boiling range components (221° C.−). In other aspects, it can be convenient to define conversion relative to 650° F. (343° C.), which corresponds to the temperature for converting 343° C.+components (vacuum gas oil or heavier) to 343° C.− compounds (fuels boiling range and lower). When describing reaction conditions based on conversion of a feed, the reaction conditions can be specified based on the wt % of compounds that are converted during the reaction relative to a conversion temperature, either 221° C. or 343° C. For example, specifying reaction conditions that correspond to 60 wt % conversion of a feed relative to 343° C. means that relative to the original amount of 343° C.+ compounds present in the feed, 60 wt % of those compounds are converted to products with boiling points of 343° C. or less. The remaining 40 wt % of the 343° C.+ compounds in the feed correspond to "unconverted" portions of the feed. This does not necessarily mean that the remaining 40 wt % of the feed is unreacted. It only means that the remaining 40 wt % of the 343° C.+ compounds in the feed still had boiling points above 343° C. after the reaction.

It is noted that in many aspects, the entirety of the hydrocarbonaceous feed introduced into the FCC reactor corresponds to components with a boiling point greater than 430° F. (221° C.). In such aspects, the amount of conversion can roughly be determined by subtracting the weight percentage of 430° F.+ (221° C.+) components in the liquid products from 100. It is further noted that for purposes of determining the amount of conversion, all coke produced in the reactor is defined as a conversion product. Therefore, when determining the amount of conversion relative to a conversion temperature, any coke production is added to the amount of feed converted relative to the conversion temperature.

In this discussion, unless otherwise specified, conversion is defined on a per-pass conversion basis. In this discussion, unless otherwise specified, conversion relative to a conversion temperature is defined as conversion for the total hydrocarbonaceous feed introduced into the FCC reactor. In some alternative aspects, a conversion percentage may be specified relative to a conversion temperature for conversion of only the fresh feed introduced into a reactor, excluding any recycle.

In various aspects, reference may be made to one or more types of fractions generated during distillation of a petroleum feedstock. Each of these types of fractions can be defined based on a boiling range, such as a boiling range that includes at least ~90 wt % of the fraction, or at least ~95 wt % of the fraction. For example, for naphtha fractions, at least ~90 wt % of the fraction, or at least ~95 wt %, can have a boiling point in the range of ~85° F. (~29° C.) to ~430° F. (~221° C.). For a light cycle oil (LCO) fraction or a diesel fraction, 90 wt % or more of the fraction, or 95 wt % or more, such as up to substantially of the fraction, can have a boiling point in the range of ~430° F. (~221° C.) to ~650° F. (~343° C.). For a (vacuum) gas oil fraction, 80 wt % or more of the fraction, or 90 wt % or more, or ~95 wt % or more, such as up to substantially all of the fraction, can have a boiling point in the range of ~650° F. (~343° C.) to ~1100° F. (~593° C.). It is noted that some fractions that are conventionally referred to as "vacuum gas oil" fractions may in fact correspond to a mixture of vacuum gas oil and another fraction under the definitions provided herein. Depending on how the distillation is performed, some conventional "vacuum gas oil" fractions can include up to 30 wt % of components boiling below 343° C. and/or above 593° C. In this discussion, 343° C.+ fractions used as feeds may be referred to as vacuum gas oil boiling range fractions, while an FCC product fraction of 343° C.+compounds can be referred to as an unconverted fraction.

In this discussion, a shale crude oil is defined as a petroleum product with a final boiling point greater than 550° C., or greater than 600° C., that is extracted from a shale petroleum source. A shale oil fraction is defined as a boiling range fraction derived from a shale crude oil.

Unless otherwise specified, distillation points and boiling points can be determined according to ASTM D2887. For samples that are not susceptible to characterization using ASTM D2887, D7169 can be used. It is noted that still other methods of boiling point characterization may be provided in the examples. The values generated by such other methods are believed to be indicative of the values that would be obtained under ASTM D2887 and/or D7169.

In some aspects, a fraction (such as a shale oil fraction or a bio-derived fraction) can correspond to a fraction that has not been hydroprocessed and/or that has not been cracked. In this discussion, a non-hydroprocessed fraction is defined as a fraction that has not been exposed to more than 10 psia of $H_2$ in the presence of a catalyst comprising a Group VI metal, a Group VIII metal, a catalyst comprising a zeolitic framework, or a combination thereof. In this discussion, a non-cracked fraction is defined as a fraction that has not been exposed to a temperature of 400° C. or more.

In this discussion, a hydroprocessed fraction is defined as a hydrocarbon fraction and/or hydrocarbonaceous fraction that has been exposed to a catalyst having hydroprocessing activity in the presence of 300 kPa-a or more of $H_2$ at a temperature of 200° C. or more. A hydroprocessed fraction can be hydroprocessed prior to separation of the fraction from a crude oil or another wider boiling range fraction.

In this discussion, a carbon-containing fuel is defined as a fuel where combustion of the fuel results in formation of $CO_2$. Methane is an example of a carbon-containing fuel, as combustion of methane results in formation of $CO_2$ and $H_2O$. By contrast, combustion of $H_2$ results only in formation of $H_2O$.

In this discussion, the lower heating value of a fuel has the conventional definition of the theoretical total quantity of heat liberated by combustion of a fuel to form fully oxidized products (e.g., $CO_2$ and $H_2O$) at 25° C. and 101 kPa-a, with all generated water remaining in the vapor phase.

Feedstocks for FCC Reactor

A variety of types of feedstocks can be incorporated into the feed to an FCC reactor. Some feedstocks can correspond to conventional feedstocks. Other feedstocks can correspond to bio-derived fractions. Still other feedstocks can correspond to low carbon intensity feedstocks. Still other feedstocks can correspond to conventional feedstocks that have a reduced or minimized tendency to form coke under FCC processing conditions. In some aspects, a feed can substantially correspond to one type of feedstock. Examples include feeds containing 95 wt % or more of one or more bio-derived fractions, or 95 wt % or more of one or more low carbon intensity feedstocks, or 95 wt % or 95 wt % or more of one or more conventional feedstocks that have a reduced or minimized tendency to form coke under FCC processing conditions, or 95 wt % or more of one or more conventional feedstocks. Such feeds can potentially include up to 100 wt % of the corresponding feedstock.

In other aspects, a feed can correspond to a blend or mixture two or more types of feedstocks. In some aspects, a feed can include 5.0 wt % to 95 wt % of bio-derived fraction, or 5.0 wt % to 50 wt %, or 5.0 wt % to 35 wt %, or 5.0 wt % to 20 wt %, or 20 wt % to 95 wt %, or 20 wt % to 50 wt %, or 35 wt % to 95 wt %, or 50 wt % to 95 wt %. Additionally or alternately, in some aspects, a feed can include 5.0 wt % to 95 wt % of low carbon intensity feedstock, or 5.0 wt % to 50 wt %, or 5.0 wt % to 35 wt %, or 5.0 wt % to 20 wt %, or 20 wt % to 95 wt %, or 20 wt % to 50 wt %, or 35 wt % to 95 wt %, or 50 wt % to 95 wt %. Further additionally or alternately, in some aspects, a feed can include 5.0 wt % to 95 wt % of a conventional feedstock and/or a conventional feedstock having a reduced or minimized tendency to form coke under FCC processing conditions, or 5.0 wt % to 50 wt %, or 5.0 wt % to 35 wt %, or 5.0 wt % to 20 wt %, or 20 wt % to 95 wt %, or 20 wt % to 50 wt %, or 35 wt % to 95 wt %, or 50 wt % to 95 wt %. It is noted that a feed can also potentially include less than 5.0 wt % of any of the above types of feedstocks.

As examples of properties, a vacuum gas oil fraction derived from some Permian crudes can have an initial boiling point of 371° C. and a final boiling point of 538° C. and/or a T10 distillation point of 385° C. to 395° C. and a T90 distillation point of 480° C. to 490° C. Such a vacuum gas oil fraction can have an unexpectedly high ratio of naphthenes (cycloparaffins) to aromatics of 1.0 or more, or 1.5 or more, or 2.0 or more, such as up to 6.0 or possibly still higher, while also including 8.0 wt % to 32 wt % aromatics, or 8.0 wt % to 22 wt %, or 10 wt % to 32 wt %, or 10 wt % to 22 wt %. The vacuum gas oil fraction can further have an unexpected combination of a low density at 15° C. of 860 $kg/m^3$ to 892 $kg/m^3$ (or 860 $kg/m^3$ to 882 $kg/m^3$); an energy content of 42.4 MJ/kg or greater; a low kinematic viscosity at 50° C. of 20 cSt to 30 cSt; a low sulfur content of 0.03 wt % to 0.20 wt %; a low nitrogen content of 1000 wppm or less, or 850 wppm or less, or 350 wppm or less, such as down to 30 wppm; a CCAI value of 760 to 785; a molar ratio of hydrogen to carbon of greater than 1.8; and an acid number of less than 0.15 mg KOH/kg, or less than 0.12 mg KOH/kg.

Additionally or alternately, in some aspects at least a portion of the feed to an FCC reactor can correspond to a bio-derived fraction. Bio-derived fractions are derived from biomass, and therefore the carbon in a bio-derived fraction can correspond to carbon that was originally extracted from the air during growth of the biomass. As a result, any $CO_2$ generated from the biomass is offset or partially offset by the $CO_2$ that was consumed during biomass growth.

Biomass oil can generally correspond to $C_{5+}$ hydrocarbonaceous compounds that are formed during the biomass conversion process, although other compounds could be present if they are liquid at 20° C. and 100 kPa-a. The oxygen content of the biomass oil can vary depending on the nature of the conversion process used to form the biomass. In some aspects, the oxygen content of the biomass oil can be between 2.0 wt % to 60 wt %, or 2.0 wt % to 50 wt %, or 5.0 wt % to 60 wt %, or 5.0 wt % to 50 wt %, or 10 wt % to 60 wt %, or 10 wt % to 50 wt %. It is noted that the range of oxygen contents may be somewhat lower for biomass oil formed by certain methods, such as hydrothermal liquefaction. In some aspects, the biomass oil can have an oxygen content of 5.0 wt % to 20 wt %, or 5.0 wt % to 15 wt %.

Still yet another option can be to use any convenient type of biomass that can be delivered into the FCC reactor and/or into the regenerator as a supplemental fuel. This can potentially include vegetable oils, animal fats, waste biomass streams (e.g., corn oil generated during fermentation of corn biomass), and/or other convenient biomass streams.

More generally, a wide range of petroleum and chemical feedstocks can be incorporated into a feed for an FCC reactor. Suitable feedstocks include whole and reduced petroleum crudes, atmospheric, cycle oils, gas oils, including vacuum gas oils and coker gas oils, light to heavy distillates including raw virgin distillates, hydrocrackates, hydrotreated oils, extracts, slack waxes, Fischer-Tropsch waxes, raffinates, and mixtures of these materials. Additionally or alternately, an FCC input feed can include, for example, feeds with an initial boiling point and/or a T5 boiling point and/or T10 boiling point of at least 430° F. (221° C.), or at least ~600° F. (~316° C.), or at least ~650° F. (~343° C.), or at least ~700° F. (371° C.), or at least ~750° F. (~399° C.). Additionally or alternately, the final boiling point and/or T95 boiling point and/or T90 boiling point of the feed can be ~1100° F. (~593° C.) or less, or ~ 1050° F. (~566° C.) or less, or ~1000° F. (~538° C.) or less, or ~950° F. (~510° C.) or less. In particular, a feed can have a T5 to T95 boiling range of ~316° C. to ~593° C., or a T5 to T95 boiling range of ~343° C. to ~566° C., or a T10 to T90 boiling range of ~343° C. to ~566° C. Such fractions generally correspond to vacuum gas oil fractions, with some inclusion of lower and/or higher boiling components. Optionally, it can be possible to use a feed that includes a lower boiling range portion. Such a feed can have an initial boiling point and/or a T5 boiling point and/or T10 boiling point of at least ~350° F. (~177° C.), or at least ~400° F. (~204° C.), or at least 430° F. (221° C.), or at least ~450° F. (~232° C.). In particular, such a feed can have a T5 to T95 boiling range of ~177° C. to ~593° C., or a T5 to T95 boiling range of ~221° C. to ~593° C., or a T10 to T90 boiling range of ~177° C. to ~566° C., or a T10 to T90 boiling range of 221° C. to 566° C. Still another option for characterizing a fraction for use as a feed for an FCC reactor can be based on a T50 distillation point. In some aspects, a feed can have a T50 distillation point of 343° C. or higher, or 371° C. or higher, or 400° C. or higher, such as up to 525° C. or possibly still higher. Optionally, it is noted that for feeds with substantially increased amounts of paraffins and/or saturates, it may be possible to include additional feed components with a boiling range greater than 593° C.

In some aspects, the feed and/or a feedstock corresponding to at least a portion of the feed can have a sulfur content of ~500 wppm to ~50000 wppm or more, or ~500 wppm to ~20000 wppm, or ~500 wppm to ~10000 wppm. Additionally or alternately, the nitrogen content of such a feed can be ~20 wppm to ~8000 wppm, or ~50 wppm to ~4000 wppm. In some aspects, the feed can correspond to a "sweet" feed, so that the sulfur content of the feed can be ~10 wppm to ~500 wppm and/or the nitrogen content can be ~1 wppm to ~100 wppm. In still other aspects, a feed can be substantially free from sulfur, such as a feed that is substantially composed of bio-derived fractions and/or heavily hydroprocessed fractions.

Optionally, prior to FCC processing, a feedstock can be hydrotreated. An example of a suitable type of hydrotreatment can be hydrotreatment under trickle bed conditions. Hydrotreatment can be used, optionally in conjunction with other hydroprocessing, to form an input feed for FCC processing based on an initial feed. Hydroprocessing can, for example, reduce the sulfur content and nitrogen content of a feedstock. The sulfur and/or nitrogen contents described herein can correspond to sulfur contents and/or nitrogen contents either prior to hydroprocessing or after hydroprocessing.

Supplemental Fuels

In various aspects, the combination of the feed delivered to the FCC reactor and the conditions for operating the FCC reactor can cause the coke produced in the FCC reactor to be insufficient to provide heat balance for the FCC reaction system during combustion in the regenerator. In such aspects, at least a portion of the heat provided to the FCC reactor from the FCC regenerator can correspond to heat provided by combustion of a supplemental fuel.

The amount of coke production required to maintain heat balance in an FCC reaction system can vary depending on the specific configuration. However, the amount of coke in the FCC regenerator that is needed for heat balance can generally correspond to 3.0 wt % to 6.5 wt % coke, relative to the weight of the feed introduced into the FCC reactor. Under this definition, the "coke" corresponds to any coke on the FCC catalyst plus any other trapped/entrained compounds that are carried with the FCC catalyst from the reactor to the regenerator. With regard to determining the amount of coke on a catalyst sample, commercially available units are available for performing this determination. In this discussion, coke contents on catalyst samples were determined using a LECO SC 632 carbon, sulfur analyzer. This commercially available unit measures coke on a catalyst sample by performing combustion on the coke and measuring the resulting amount of $CO_2$ that is generated. It is believed that comparable values could be determined using other combustion-based carbon, sulfur analyzers available from LECO Corporation of St. Joseph, MI.

In various aspects, the amount of coke passed into the FCC regenerator from the FCC reactor can correspond to 10.0 wt % or less of coke relative to the weight of the feed to the FCC reactor, or 8.0 wt % or less, or 6.0 wt % or less, or 5.5 wt % or less, or 5.0 wt % or less, or 4.5 wt % or less, or 4.0 wt % or less, or 3.5 wt % or less, such as down to 1.0 wt % or possibly still lower. This coke amount is relative to the total hydrocarbonaceous feed amount introduced into the FCC reactor, including any recycled fractions (such as a recycled FCC bottoms or catalytic slurry oil fraction).

It is noted that some coke may remain on the catalyst after passing through the regenerator, even though the regenerator conditions are selected to perform substantially complete combustion. Thus, the heat generated in the regenerator corresponds to heat generated from the difference between coke entering the regenerator and coke exiting from the regenerator. This amount of coke is sometimes referred to as "delta coke". In this discussion, complete combustion of all coke on a catalyst is defined as reducing the average weight of coke on catalyst to 0.05 wt % or less, relative to the weight of the catalyst. In some aspects, the amount of coke remaining on the catalyst after combustion can be 0.5 wt % or less, or 0.3 wt % or less, or 0.2 wt % or less, down to having substantially complete combustion of all coke.

When the coke made from a feed is not sufficient to maintain heat balance at a target set of conditions, a supplemental fuel can be added to the FCC regenerator. Conventionally, there is substantially no benefit to adding a supplemental fuel to the regenerator unless the FCC reaction system cannot maintain heat balance at a desired or target operating temperature (and/or at other target operating conditions). Various types of supplemental fuels can be used for the FCC regenerator. In some aspects, the supplemental fuel can correspond to a bio-derived fraction, such as biomass oil, pyrolysis oil, vegetable oil, waste biomass streams, and/or another convenient type of bio-derived fraction. Additionally or alternately, in some aspects the supplemental fuel can correspond to a carbon-containing fuel. Optionally, at least a portion of the carbon-containing supplemental fuel can correspond to such a bio-derived fraction. In some optional aspects, a supplemental fuel can consist essentially of carbon-containing fuel, so that the lower heating value of any $H_2$ in the supplemental fuel corresponds to less than 5.0% of the total lower heating value of the supplemental fuel.

Supplemental fuel can be added to the regenerator in any convenient manner. One option can be to introduce supplemental fuel in the same manner that a torch oil would be introduced during the start-up phase for the FCC reaction system. Another option can be to have dedicated conduits for introducing the supplemental fuel into the regenerator. Still another option can be to introduce the supplemental fuel into a pre-combustion chamber, catalyst heater, or another type of secondary regeneration vessel associated with the regenerator. Still another option can be to add the supplemental fuel to the FCC stripper and/or a transfer line between the FCC reactor and the FCC regenerator. It is noted that such a secondary regeneration vessel may correspond to the actual location of combustion for the supplemental fuel. Introducing a supplemental fuel into either a primary regenerator vessel or a secondary regeneration vessel is included within the definition of introducing a supplemental fuel into the regenerator herein. It is noted that the combustion conditions in a secondary regenerator vessel can be the same as the combustion conditions in the primary regenerator vessel, or the combustion conditions in the secondary regenerator vessel can be different. In the event that the supplemental fuel is at least partially in the form of solid biomass particles, various types of feeders are available for introducing the supplemental fuel into the regenerator and/or secondary regeneration vessel, such as screw feeders.

In some aspects where at least a portion of the supplemental fuel corresponds to a pyrolysis oil (and/or optionally another type of biomass oil), the pyrolysis oil can be introduced into a regenerator or other vessel along with a fluid stream for atomizing or distributing the pyrolysis oil. In such aspects, the fluid stream for atomizing or otherwise assisting with distributing the pyrolysis oil (and/or optionally biomass oil) can correspond to a fluid stream at a temperature of between 20° C. and 80° C. Conventionally, steam is a commonly used atomization stream for distributing a fuel into a combustion zone. However, due to the lower temperature for the atomization stream in this type of aspect, the fluid for atomization can correspond to $N_2$ and/or other lower temperature gases that are compatible with the regeneration environment. Without being bound by any particular theory, it is believed that using a fluid stream at a temperature between 20° C. and 80° C. for atomization of pyrolysis oil can reduce or minimize the potential for decomposition of the pyrolysis oil while also reducing or minimizing changes in fluid flow properties due to increased viscosity at lower temperatures.

In various aspects, the amount of supplemental fuel combusted in the regenerator can be characterized relative to the amount of coke combusted in the regenerator. One option for making such a comparison would be to compare lower heating values for the coke and lower heating values for the supplemental fuel, relative to the weight of each in the regenerator. While this could be done, this would require detailed calculations based on the exact composition of the coke, including the sulfur, nitrogen, and hydrogen contents of the coke. It is noted that any hydrocarbons or other components that are not stripped from an FCC catalyst prior to entering the regenerator are considered as part of the coke under this definition. Additional detailed calculations based on the composition of the supplemental fuel would also be needed.

In order to avoid the need for detailed calculations to determine exact lower heating values for the coke (including trapped hydrocarbons), in this discussion the relative amounts of supplemental fuel and coke are compared based on a weight of coke in the regenerator and an adjusted weight for the supplemental fuel. In aspects where a portion of the supplemental fuel corresponds to $H_2$, it is noted that $H_2$ has a relatively high heat of combustion per unit mass (such as grams). To account for this, an adjusted weight of supplemental fuel is defined as three times the weight of molecular hydrogen ($H_2$) in the supplemental fuel plus the weight of all other components in the supplemental fuel that have a non-zero heat of combustion.

The adjusted weight of the supplemental fuel can then be compared with the weight of coke in the regenerator, as measured based on the average weight of coke on the FCC particles entering the regenerator. In various aspects, a ratio of the adjusted weight of supplemental fuel to weight of coke in the regenerator can be 0.01 or more, or 0.1 or more. In other words, the adjusted weight of the supplemental fuel (after multiplying the weight of any $H_2$ by 3.0) can be greater than 1.0% of the weight of the coke, or greater than 10% of the weight of coke. Due to the relatively low heat of combustion for coke, this can roughly correspond to having the supplemental fuel contribute 1.5% or more of the heat, or 15% or more of the heat, that is passed into the FCC reactor from the regenerator. More generally, a ratio of the adjusted weight of supplemental fuel to the weight of coke can be 0.01 or more, or 0.05 or more, or 0.1 or more, or 0.2 or more, or 0.3 or more, or 0.5 or more. In such aspects, the ratio of adjusted weight of supplemental fuel to weight of coke can be 0.01 to 10, or 0.01 to 5.0, or 0.01 to 2.0, or 0.01 to 1.0, or 0.01 to 0.5, or 0.05 to 10, or 0.05 to 5.0, or 0.05 to 2.0, or 0.05 to 1.0, or 0.05 to 0.5, or 0.1 to 10, or 0.1 to 5.0, or 0.1 to 2.0, or 0.1 to 1.0, or 0.2 to 10, or 0.2 to 5.0, or 0.2 to 2.0, or 0.2 to 1.0, or 0.3 to 10, or 0.3 to 5.0, or 0.3 to 2.0, or 0.5 to 10, or 0.5 to 5.0, or 0.5 to 2.0.

FCC Processing Conditions—General

A variety of different types of reactor vessels can be used for performing fluid catalytic cracking. Examples of suitable reactors can include, but are not limited to, riser reactors, partial riser reactors, and reactor vessels. Generally, within the reactor, the feeds for co-processing can be contacted with a catalytic cracking catalyst under cracking conditions thereby resulting in spent catalyst particles containing carbon deposited thereon and a lower boiling product stream. The cracking conditions can be selected to achieve a target level of conversion in the reactor. The different styles of reactor can be used to perform fluid catalytic cracking under different regimes for residence time of feed within the reactor. For example, in a reactor vessel, residence times of up to 30 seconds may be appropriate. The longer residence times in a reactor vessel can be used, for example, with a lower activity catalyst to provide a target level of feed conversion while maintaining higher distillate yields and/or reducing or minimizing coke formation. In some aspects, such conditions can create problems when attempting to maintain heat balance at a target temperature (and/or at a target set of processing conditions). By contrast, within a riser reactor, average residence times can be as short as a few seconds. Riser reactors can be used, for example, to provide a narrower distribution of residence times around the average residence time, as the riser reactor can be operated under conditions that more closely approximate laminar flow or plug flow.

In some aspects, the cracking conditions selected in order to achieve a target level of conversion can include: temperatures from 900° F. to 1100° F. (~482° C. to ~593° C.), or 900° F. to 1060° F. (~482° C. to ~571° C.), or 950° F. to 1040° F. (~510° C. to ~560° C.); hydrocarbon partial pressures from 10 to 50 psia (~70-350 kPa-a), or from 20 to 40 psia (~140-280 kPa-a); and a catalyst to feed (wt/wt) ratio from 3 to 8, or 5 to 6, where the catalyst weight can correspond to total weight of the catalyst composite. Steam may be concurrently introduced with the feed into the reaction zone. The steam may comprise up to 5 wt % of the feed. In aspects where a riser reactor is used, the FCC feed residence time in the reaction zone can be less than 5 seconds, or from 3 to 5 seconds, or from 2 to 3 seconds. In aspects where a reactor vessel is used, the average residence time for the FCC feed in the reaction zone can range from 3 seconds to 30 seconds, or 3 seconds to 15 seconds. In aspects where a partial riser reactor is used, the residence times can be intermediate to the values for a riser reactor and a reactor vessel.

Another factor for controlling the FCC reaction conditions can be the weight ratio of catalyst to oil in the reactor. Generally, the weight ratio of catalyst to oil in the reactor can range from roughly 2.0 to 15, or 2.0 to 10, or 4.0 to 15, or 4.0 to 10, or 6.0 to 15, or 6.0 to 10. In some aspects where a low catalyst to oil weight ratio is desired, the weight ratio of catalyst to oil can be 2.0 to 8.0, or 2.0 to 6.0.

Catalysts suitable for use within the FCC reactor can be fluid cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than ~0.65 nm, or greater than ~0.7 nm, which are typically used to catalytically "crack" hydrocarbon feeds. In various aspects, both the large-pore molecular sieves and the medium-pore molecular sieves used herein be selected from those molecular sieves having a crystalline tetrahedral framework oxide component. For example, the crystalline tetrahedral framework oxide component can be selected from the group consisting of zeolites, tectosilicates, tetrahedral aluminophosphates (ALPOs) and tetrahedral silicoaluminophosphates (SAPOs). Preferably, the crystalline framework oxide component of both the large-pore and medium-pore catalyst can be a zeolite. More generally, a molecular sieve can correspond to a crystalline structure having a framework type recognized by the International Zeolite Association. It should be noted that when the cracking catalyst comprises a mixture of at least one large-pore molecular sieve catalyst and at least one medium-pore molecular sieve, the large-pore component can typically be used to catalyze the breakdown of primary products from the catalytic cracking reaction into clean products such as naphtha and distillates for fuels and olefins for chemical feedstocks.

Large pore molecular sieves that are typically used in commercial FCC process units can be suitable for use herein. FCC units used commercially generally employ conventional cracking catalysts that include large-pore zeolites such as USY or REY. Additional large pore molecular sieves that can be employed in accordance with the present invention include both natural and synthetic large pore zeolites. Non-limiting examples of natural large-pore zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Non-limiting examples of synthetic large pore zeolites are zeolites X, Y, A, L, ZK-4, ZK-5, B, E, F, H, J, M, Q, T, W, Z, alpha and beta, omega, REY, and USY zeolites, as well as MSE framework materials (such as MCM-68). In some aspects, the large pore molecular sieves used herein can be selected from large pore zeolites. In such aspects, suitable large-pore zeolites for use herein can be the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. An example of a suitable medium pore zeolite can be ZSM-5, described (for example) in U.S. Pat. Nos. 3,702,886 and 3,770,614. Other suitable zeolites can include ZSM-11, described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, described (for example) in U.S. Pat. No. 4,440,871 can also be used herein. Non-limiting examples of other medium pore molecular sieves that can be used herein include chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651 and iron aluminosilicates. All of the above patents are incorporated herein by reference.

The medium-pore size zeolites (or other molecular sieves) used herein can include "crystalline admixtures" which are thought to be the result of faults occurring within the crystal or crystalline area during the synthesis of the zeolites. Examples of crystalline admixtures of ZSM-5 and ZSM-11 can be found in U.S. Pat. No. 4,229,424, incorporated herein by reference. The crystalline admixtures are themselves medium-pore size zeolites, in contrast to physical admixtures of zeolites in which distinct crystals of crystallites of different zeolites are physically present in the same catalyst composite or hydrothermal reaction mixtures.

In some aspects, the large-pore zeolite catalysts and/or the medium-pore zeolite catalysts can be present as "self-bound" catalysts, where the catalyst does not include a separate binder. In some aspects, the large-pore and medium-pore catalysts can be present in an inorganic oxide matrix component that binds the catalyst components together so that the catalyst product can be hard enough to survive inter-particle and reactor wall collisions. The inorganic oxide matrix (or binder) can be made from an inorganic oxide sol or gel, which can be dried to bind the catalyst components together. Preferably, the inorganic oxide matrix can be comprised of oxides of silicon and aluminum. It can be preferred that separate alumina phases be incorporated into the inorganic oxide matrix. Species of aluminum oxy-hydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species can be an aluminum trihydroxide such as gibbsite, bayerite, nordstrandite, or doyelite. Additionally or alternately, the matrix material may contain phosphorous or aluminum phosphate. Optionally, the large-pore catalysts and medium-pore catalysts be present in the same or different catalyst particles, in the aforesaid inorganic oxide matrix.

In the FCC reactor, the cracked FCC product can be removed from the fluidized catalyst particles. Preferably, this can be done with mechanical separation devices, such as an FCC cyclone. The FCC product can be removed from the reactor via an overhead line, cooled and sent to a fractionator tower for separation into various cracked hydrocarbon product streams. These product streams may include, but are not limited to, a light gas stream (generally comprising $C_4$ and lighter hydrocarbon materials), a naphtha (gasoline) stream, a distillate (diesel and/or jet fuel) steam, and other various heavier gas oil product streams. The other heavier stream or streams can include a bottoms stream.

In the FCC reactor, after removing most of the cracked FCC product through mechanical means, the majority of, and preferably substantially all of, the spent catalyst particles can be conducted to a stripping zone within the FCC reactor. The stripping zone can typically contain a dense bed (or "dense phase") of catalyst particles where stripping of volatiles takes place by use of a stripping agent such as steam. There can also be space above the stripping zone with a substantially lower catalyst density which space can be referred to as a "dilute phase". This dilute phase can be thought of as either a dilute phase of the reactor or stripper in that it will typically be at the bottom of the reactor leading to the stripper.

After stripping, the stripped catalyst particles will still have some carbon-containing compounds associated with the catalyst. Some of these carbon-containing compounds can correspond to amorphous coke, while other compounds may correspond to hydrocarbonaceous compounds that are trapped within the amorphous coke. In this discussion, all of the carbon-containing compounds and hydrocarbonaceous compounds retained on a catalyst after stripping are generally referred to as coke.

In some aspects, the majority of, and preferably substantially all of, the stripped catalyst particles are subsequently conducted to a regeneration zone wherein the spent catalyst particles are regenerated by burning coke from the spent catalyst particles in the presence of an oxygen-containing gas such as air, thus producing regenerated catalyst particles. It is noted that the oxygen-containing gas can include a higher percentage of oxygen than air, such as by using an oxygen-containing gas corresponding to air that is supplemented with oxygen from an air separation unit. It is further noted that while air is a convenient source of oxygen, any other diluent could also be used. Thus, an oxygen-containing gas corresponding to oxygen with $CO_2$ as a diluent in place of and/or in addition to $N_2$ could be used. This regeneration step restores catalyst activity and simultaneously heats the catalyst to a temperature from 1200° F. to 1400° F. (~649 to 760° C.). The majority of, and preferably substantially all of, the hot regenerated catalyst particles can then be recycled to the FCC reaction zone where they contact injected FCC feed.

In some aspects, the regeneration zone can correspond to a single vessel. In other aspects, a plurality of regeneration zones and/or a plurality of vessels can be used. For example, in a 2-stage regenerator, a first regeneration stage can be operated at a lower temperature while a second stage is operated at a higher temperature but with a lower steam content. Since exposure to steam is one of the pathways to deactivation of FCC catalyst, reducing the steam content in a second, higher temperature stage can allow full coke combustion to be achieved while reducing or minimizing the amount of catalyst deactivation that occurs per pass in the regenerator.

CO Boiler System Conditions—General

CO Boilers are thermal oxidizers with integral waste-heat recovery systems that are used to oxidize carbon monoxide-rich waste gases, such as the regenerator flue gas generated when running the regenerator in partial burn mode. In addition to CO in the flue gas, other sources of fuel may be provided to the CO boiler. Example fuels include natural gas and refinery fuel gas. CO Boilers may operate approximately at temperature between 1400° F. and 1850° F. After the heat recovery system, the flue gas may exit the CO Boiler at approximately 500° F.-700° F.

SCR NOx Reduction Conditions—General

Regenerator flue gas $NO_x$ concentration may range from 10 ppmvd to 1000 ppmvd. Selective catalytic reduction (SCR) is a means of converting nitrogen oxides, also referred to as $NO_x$, with the aid of a catalyst into diatomic nitrogen ($N_2$) and water ($H_2O$). A reductant, such as anhydrous ammonia ($NH_3$) or aqueous ammonia ($NH_4OH$) solution, may be added to the flue gas and reacted onto a catalyst. As the reaction drives toward completion, nitrogen ($N_2$) and water ($H_2O$) are produced. The SCR may operate between at approximately 500° F.-800° F.

SCR catalysts may be made from various porous ceramic materials used as a support, such as titanium oxide, and active catalytic components are usually either oxides of base metals (such as vanadium, molybdenum and tungsten), zeolites, or various precious metals. Base metal catalysts, such as vanadium and tungsten, lack high thermal durability, but operate very well at the temperature ranges most commonly applied in industrial and utility boiler applications. Zeolite catalysts have the potential to operate at substantially higher temperature than base metal catalysts.

Wet Gas Scrubber Conditions—General

As used herein, the term wet gas scrubber includes a variety of devices that remove pollutants from a gas stream, such as the regenerator flue gas, by bringing the gas stream into contact with a scrubbing liquid. Contact methods can include spraying the flue gas with the scrubbing liquid, forcing the flue gas through a pool of scrubbing liquid, or by some other contact method to remove pollutants from the flue gas. The wet gas scrubber used to treat the regenerator flue gas herein can be designed to remove $SO_x$ and particulate (e.g., catalyst fines) with a caustic solution. Wet gas scrubbers can achieve high removal efficiencies for particles or gases. However, additional particle collection may occur through a wet electrostatic precipitator, such as described in examples 1, 2 and 3.

In one aspect, a venturi scrubber is used. With venturi scrubbers, the flue gas entering a scrubber is forced at high velocity through a venturi nozzle where it collides with scrubbing liquid, such as a caustic solution (NaOH). The tiny water droplets capture particles through impaction and diffusion. The mist eliminator for a venturi scrubber may be a separate device called a cyclonic separator. The mist eliminator removes most mist from the flue gas, but some mist may pass through the mist eliminator. The dirty water is then removed in the cyclonic separator and discharged into a recycle tank. Some of the liquid may be continuously purged to limit the solids concentration and allow recirculation back to the venturi section. The wet gas scrubber may remove 80% or more of the $SO_x$ in the flue gas, or more than 95% or more, such as 97%.

Wet Electrostatic Precipitator Conditions—General

Wet Electrostatic Precipitators (WESP) are polishing devices to remove fine particles and condensed aerosols, such as acid mist from the flue gas. The WESP includes tubes through which the flue gas flows vertically. A discharge electrode is placed in the center of each tube. An electric field is created around the discharge electrodes to generate a flow of electrons. As the flue gas passes through the tubes, particles and aerosols become electrically charged through collisions with the fast-moving electrons. Once charged, the particles and aerosols migrate through the electric field towards the tube wall where they are collected in a liquid film on the tube surface. The gas direction can be either top to bottom or bottom to top.

Carbon Capture System

A carbon capture system receives an input containing $CO_2$, removes non-$CO_2$ constituents, and outputs a substantially pure $CO_2$ stream. In aspects described herein, the carbon capture system may remove water, nitrogen, oxygen and other constituents from the flue gas. The degree of constituent removal can be configured according to the requirements of a downstream $CO_2$ transport system and/or storage system.

Main Air Blower

The main air blower (MAB) provides air to the regenerator. The airflow rates generated by the MAS may be approximately 100-300 MMSCFD depending on the scale of FCC. The main air blower may be an axial or centrifugal compressor. Axial flow compressors include multiple stages of rotating and stationary blades (or stators), through which air is drawn in parallel to the axis of rotation and incrementally compressed as it passes through each stage. In aspects, an axial compressor used as the MAB includes 11 to 12 stages or more.

Examples of Reaction System Configurations

FIG. 1 shows an example of a reaction system for FCC processing and regeneration under full burn regenerator conditions. Under full burn conditions, substantially all of the carbon in the coke on the catalyst is converted into $CO_2$ with minimal CO (e.g., less than 1%) present in the resulting regenerator flue gas 128. Operating in full burn conditions may eliminate the need to pass the flue gas through a CO boiler. Whether the flue gas needs to pass through a CO boiler may depend on governing environmental conditions and a $CO_2$ capture system's inlet criteria. During startup, the treated flue gas may be vented to the atmosphere through the two-way water seal 143. Accordingly, the amount of CO in the flue gas should satisfy applicable environmental regulations. If the amount of CO in the flue gas does not satisfy environmental regulations, then the recycle loops with CO boilers illustrated in FIGS. 2 and 3 should be used instead. Similarly, if the amount of CO in the flue gas exceeds the amount of CO that can be handled by the $CO_2$ capture system 162, then the recycle loops with CO boilers illustrated in FIGS. 2 and 3 should be used instead. On the other hand, the system shown in FIG. 1 is suitable when the CO in the flue gas satisfies environmental conditions and $CO_2$ capture inlet conditions.

In FIG. 1, a feedstock 108 is processed in an FCC reaction system 110. In the configuration shown in FIG. 1, the FCC reaction system can include a reactor 110 plus associated separation stages, and a regenerator 120. The feedstock 108 can correspond to, for example, a vacuum gas oil boiling range fraction, a bio-derived fraction, or another type of fraction that is typically processed in an FCC reactor. The reactor 110 can convert at least a portion of feedstock 108 to form various products 112. These products can include a $C_{4-}$ product, a naphtha boiling range product, a light cycle oil (diesel boiling range product), a heavy cycle oil (343° C.+ product), and bottoms (additional 343° C.+ product) or catalytic slurry oil.

During operation of the reactor 110, coke can form on the catalyst or otherwise become associated with the catalyst within the reactor 110 to form spent catalyst. This spent catalyst 114 can be withdrawn into regenerator 120 and exposed to regeneration (fluidized bed combustion) conditions in the presence of oxygen 164 combined with recycled flue gas 163 and steam to form regenerated catalyst 122 and a regenerator flue gas 128. In addition to the coke on spent catalyst 114, a supplemental fuel 125 can be introduced into the regenerator 120 for supplemental heat.

The regenerated catalyst 122 may be passed into a catalyst stripper 124 that removes $CO_2$ from the regenerated catalyst to produce $CO_2$ reduced regenerated catalyst 126. Under oxygen-fired operation, the $CO_2$ content in the regenerator 120 may be significantly higher (e.g., 80% vs. 15% by vol %) than in an air-fired operation. In contrast, under air-fired operation, the nitrogen content of regenerator 120 is significantly higher (e.g., 80%). The higher $CO_2$ in the regenerator 120 means the gas in the regenerated catalyst 122 will include more $CO_2$ than would be present in the regenerated catalyst under air-fired operation. Under some conditions, the additional $CO_2$ in the product 112 may disrupt refinery operations because the refinery components downstream of the FCC may not be optimized for the additional $CO_2$ content. The use of the catalyst stripper 124 to remove $CO_2$ can avoid a need to adjust downstream operations to handle the additional $CO_2$. The catalyst stripper 124 can reduce $CO_2$ levels in the $CO_2$ reduced regenerated catalyst 126 to a level similar to that found in the regenerated catalyst returned under air-fired operations. For example, the $CO_2$ level in the $CO_2$ reduced regenerated catalyst 126 may be reduced by approximately 90% or greater. The $CO_2$ removal in the air stripper 124 can maintain status quo conditions elsewhere in the refinery. However, in some aspects, an air stripper 124 is not used. Under some refining conditions, the additional $CO_2$ in the product 112 causes minimal disruption and other methods of addressing the $CO_2$ may be preferred.

The regenerator flue gas may be passed to a heat recovery unit 130. The heat recovery unit 130 may lower the flue gas temperature from approximately 1500° F. to 500° F.-800° F. The cooled flue gas 132 may be passed to a SCR system 134 to reduce a $NO_x$ content of the flue gas. In aspects, the cooled flue gas 132 comprises greater than 50 ppm of $NO_x$ or more, or 100 ppm or more, or 300 ppm or more, such as 400 ppm or more. The SCR system 134 may receive ammonia 136, which is used to remove the $NO_x$ from flue gas. In aspects, the SCR may reduce the $NO_x$ in the flue gas by 70% or more, or 80% or more, or 90% or more. The de-NOxed flue gas 138 is then passed to a wet gas scrubber 140. The SCR may cool the flue gas. In one aspect, a waste heat recovery unit (not shown) is provided between the SCR system 134 and the wet gas scrubber 140. The waste heat recovery unit may cool the flue gas from a temperature of approximately 500-800° F. to 250° F.

The wet gas scrubber 140 reduces the $SO_x$ content of the flue gas, cools the flue gas, and captures catalyst fines. The $SO_x$ may be reduced by using a scrubbing liquid comprising a caustic. As described previously, a venturi scrubber may be used. The venturi scrubber forces a caustic liquid and the flue gas through a venture nozzle. Additional cooling may be achieved in the wet gas scrubber by including a cooler 144 in a caustic liquid recirculation system that receives a warm caustic liquid 142 and returns a cooled caustic liquid 146 to the WGS 140. In aspects, the flue gas may be 150° F. or less upon existing wet gas scrubber.

The reduced particulate flue gas 148 may then be passed to a wet ESP 150. The wet ESP captures additional particulate and mist that was not captured by wet gas scrubber 140. In aspects, the wet ESP 150 reduces the particulate in the low particulate flue gas 152 to less than 20 mg per normal cubic meter, such as less than 15 mg per normal cubic meter, such as less than 10 mg per normal cubic meter, such as less than 5 mg per normal cubic meter, such as 1 mg per normal cubic meter. In an aspect, the low particulate flue gas 152 is heated above the dew point temperature in heater 153 after the wet ESP 150.

In an aspect, the wet ESP 150 is integrated with the wet gas scrubber 140. As used herein, integrated with the wet gas scrubber means located substantially within a footprint of the wet gas scrubber. For example, the body of the wet ESP may be installed above the wet gas scrubber 140. Additional structural supports may be added to facilitate installation of the wet ESP 150. The technology described herein may be retrofit into an existing FCC system. Integrating the wet ESP 150 with the wet gas scrubber 140 may maximize the use of limited space around and within an existing FCC system.

The low particulate flue gas 152 is then passed through a first shut off valve 154, filter 156, and a second shutoff valve 158 and into the main air blower 160. The filter 156 may remove additional particulate from the low particulate flue gas 152 before the low particulate flue gas 152 is passed to the main air blower 160. In one aspect, the filter 156 includes activated carbon. In aspects, the low particulate gas 152 is heated in heater 153 to avoid falling below dew point temperatures before entering the main air blower 160. The first shut off valve 154 and the second shutoff valve 158 are used during system startup. When the valves are closed, the flue gas exits the system through the 2-way water seal 143. The reactor regenerator system may start up in air-fired operation and then transition to oxygen-fired operation. In air-fired operation mode, air may be supplied to the system through air inlet 159.

The $CO_2$ capture-system inlet 162 receives a portion of the recycled flue gas 163 for processing by a $CO_2$ capture-system. The $CO_2$ capture-system may remove water, nitrogen, oxygen and other constituents of the recycled flue gas 163 to produce a substantially pure captured $CO_2$. The captured $CO_2$ may be used elsewhere in a refinery. The oxygen supply 164 provides substantially pure $O_2$ to be combined with the recycled flue gas 163 to form the regenerator inlet gas 165. The amount of oxygen supply and the amount of $CO_2$ passed to the $CO_2$ capture system may be used to control the composition and volumetric flow of the regenerator inlet gas 165. In aspects, the volumetric flow should be sufficient to fluidize the catalyst in the regenerator 120. It may also be desirable to keep the $O_2$ within a range that avoids overheating the regenerator 120, while providing sufficient $O_2$ to react with the coke in the regenerator 120.

Figure 2:
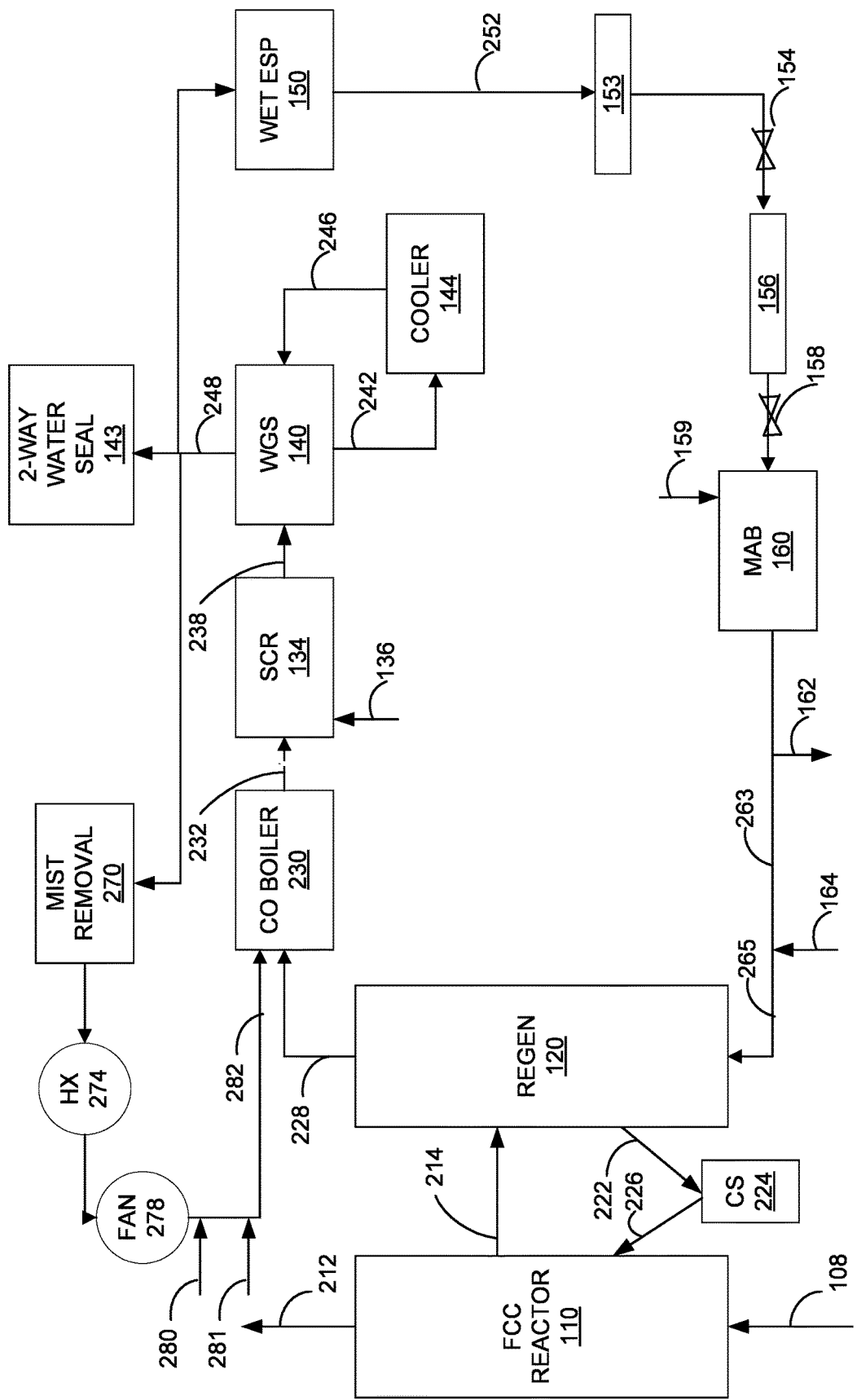
FIG. 2 shows an example of an oxygen-fired FCC regeneration system with a flue-gas recycle loop to the regenerator and a flue-gas recycle loop to a CO boiler, according to an aspect of the technology described herein.

Turning now to FIG. 2, an example reaction system for FCC processing and regeneration under partial burn regenerator conditions is shown. Under partial burn conditions, much of the carbon in the coke on the catalyst is converted into $CO_2$ with, but a meaningful amount of CO (e.g., more than 1%) is present in the resulting regenerator flue gas 228. Operating in full burn conditions may eliminate the need to pass the flue gas through a CO boiler, as described with reference to FIG. 1.

Many of the components shown in FIG. 2 and their associated operations have been described previously with reference to FIG. 1. FIG. 2 replaces a heat recovery system with a CO boiler 230. The CO boiler 230 converts CO in the flue gas into $CO_2$ and heat. In an aspect, a second source of CO 281 is also provided to the CO boiler. The second sources of CO 281 may be from other processes in a refinery. The flue gas 228 may have insufficient $O_2$ to convert the CO to $CO_2$ the CO boiler 230. For example, the $O_2$ in the flue gas 228 may be 3% vol. % or less, such as 1%. The supplemental oxygen supply 280 provides substantially pure $O_2$ to the system, instead of air to keep the system substantially free of nitrogen. The substantially pure $O_2$ is mixed with recycled flue gas 250 to form a CO boiler inlet gas 282. The recycled flue gas 250 acts a substitute for nitrogen that would be found in air, if air were used as the supplemental oxygen source for the CO boiler 230. The recycled flue gas 250 helps keep the $O_2$ in the CO boiler inlet gas 282 within a range for optimal operation. The recycled flue gas 250 also provides a useful volume of flow through the CO boiler 230.

The recycled flue gas 250 may be passed through mist removal 270, heater 274, and a fan 278 prior to being combined with the supplemental oxygen supply 280, second source of CO 281, and flue gas 228.

The cooled flue gas 232 may be passed to a SCR system 134 to reduce a $NO_x$ content of the flue gas. In aspects, the SCR may reduce the $NO_x$ in the flue gas by 70% or more, or 80% or more, or 90% or more. The SCR may cool the flue gas. In one aspect, a waste heat recovery unit (not shown) is provided between the SCR system 134 and the wet gas scrubber 140. The waste heat recovery unit may cool the flue gas from a temperature of approximately 500-800° F. to 250° F. The de-NOxed flue gas 238 is then passed to a wet gas scrubber (WGS) 140.

The wet gas scrubber 140 reduces the $SO_x$ content of the flue gas, cools the flue gas, and captures catalyst fines. Additional cooling may be achieved in the wet gas scrubber by including a cooler 144 in a caustic liquid recirculation system that receives a warm caustic liquid 242 and returns a cooled caustic liquid 246 to the WGS 140. In aspects, the flue gas may be 150° F. or less upon existing wet gas scrubber.

The reduced particulate flue gas 248 may then be passed to a wet ESP 150. The wet ESP captures additional particulate and mist that was not captured by the wet gas scrubber 140. In aspects, the wet ESP 150 reduces the particulate in the low particulate flue gas 252 to less than 20 mg per normal cubic meter, such as less than 15 mg per normal cubic meter, such as less than 10 mg per normal cubic meter, such as less than 5 mg per normal cubic meter, such as 1 mg per normal cubic meter.

In aspects, the low particulate gas 152 is heated in heater 153 to avoid falling below dew point temperatures before entering the main air blower 160. The low particulate flue gas 252 is then passed through a first shut off valve 154, filter 156, and a second shutoff valve 158 and into the main air blower 160. The filter 156 may remove additional particulate from the low particulate flue gas 252 before the low particulate flue gas 252 is passed to the main air blower 160. In one aspect, the filter 156 includes activated carbon. The first shut off valve 154 and the second shutoff valve 158 are used during system startup. When the valves are closed, the flue gas exits the system through the 2-way water seal 143. The reactor regenerator system may start up in air-fired operation and then transition to oxygen-fired operation. In air-fired operation mode, air may be supplied to the system through air inlet 159.

Figure 3:
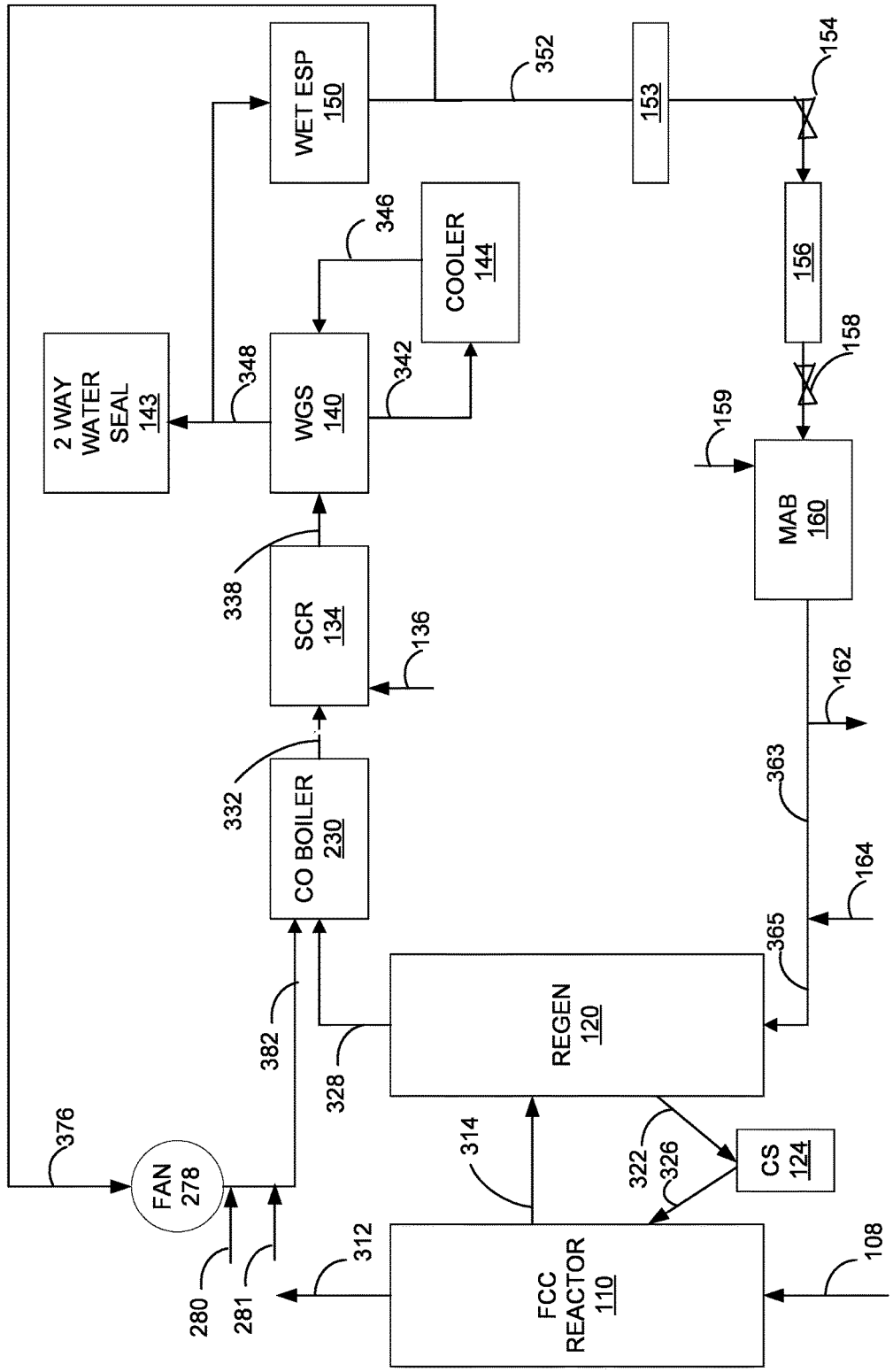
FIG. 3 shows an example of an oxygen-fired FCC regeneration system with a CO2 recycle loop to the regenerator and a flue-gas recycle loop to a CO boiler, according to an aspect of the technology described herein.

The $CO_2$ capture-system inlet 162 receives a portion of the recycled flue gas 263 for processing by a $CO_2$ capture-system. The oxygen supply 164 provides substantially pure $O_2$ to be combined with the recycled flue gas 263 to form the regenerator inlet gas 265. The amount of oxygen supply and the amount of $CO_2$ passed to the $CO_2$ capture system may be used to control the composition and volumetric flow of the regenerator inlet gas 265. In aspects, the volumetric flow should be sufficient to fluidize the catalyst in the regenerator 120. It may also be desirable to keep the $O_2$ within a range that avoids overheating the regenerator 120, while providing sufficient $O_2$ to react with the coke in the regenerator 120. Turning now to FIG. 3, an example reaction system for FCC processing and regeneration under partial burn regenerator conditions is shown. Under partial burn conditions, much of the carbon in the coke on the catalyst is converted into $CO_2$ with, but a meaningful amount of CO (e.g., more than 1%) is present in the resulting regenerator flue gas 228. Operating in full burn conditions may eliminate the need to pass the flue gas through a CO boiler, as described with reference to FIG. 1.

Many of the components shown in FIG. 3 and their associated operations have been described previously with reference to FIG. 1 and FIG. 2. FIG. 3 replaces a heat recovery system with a CO boiler 230. The CO boiler 230 converts CO in the flue gas into $CO_2$ and heat. In an aspect, a second source of CO 281 is also provided to the CO boiler. The second sources of CO 281 may be from other processes in a refinery. The flue gas 228 may have insufficient $O_2$ to convert the CO to in $CO_2$ the CO boiler 230. For example, the $O_2$ in the flue gas 228 may be 3% vol. % or less, such as 1%. The supplemental oxygen supply 280 provides substantially pure $O_2$ to the system, instead of air to keep the system substantially free of nitrogen. The substantially pure $O_2$ is mixed with recycled flue gas 376 to form a CO boiler inlet gas 282. The recycled flue gas 376 acts a substitute for nitrogen that would be found in air, if air were used as the supplemental oxygen source for the CO boiler 230. The recycled flue gas 376 helps keep the $O_2$ in the CO boiler inlet gas 282 within a range for optimal operation. The recycled flue gas 376 also provides a useful volume of flow through the CO boiler 230.

The recycled flue gas 376 may be passed through a heater (not shown) and a fan 278 prior to being combined with the supplemental oxygen supply 280, second source of CO 281, and flue gas 228. In contrast with FIG. 2, the recycled flue gas 376 is taken from downstream of the wet ESP 150 instead of upstream of the wet ESP 150. This location eliminates the need for additional moisture control for the recycled flue gas 376.

The cooled flue gas 332 may be passed to a SCR system 134 to reduce a $NO_x$ content of the flue gas. In aspects, the SCR may reduce the $NO_x$ in the flue gas by 70% or more, or 80% or more, or 90% or more. The SCR may cool the flue gas. In one aspect, a waste heat recovery unit (not shown) is provided between the SCR system 134 and the wet gas scrubber 140. The waste heat recovery unit may cool the flue gas from a temperature of approximately 500-800° F. to 250° F. The de-NOxed flue gas 338 is then passed to a wet gas scrubber (WGS) 140.

The wet gas scrubber 140 reduces the $SO_x$ content of the flue gas, cools the flue gas, and captures catalyst fines. Additional cooling may be achieved in the wet gas scrubber by including a cooler 144 in a caustic liquid recirculation system that receives a warm caustic liquid 342 and returns a cooled caustic liquid 346 to the WGS 140. In aspects, the flue gas may be 150° F. or less upon existing wet gas scrubber.

The reduced particulate flue gas 348 may then be passed to a wet ESP 150. The wet ESP captures additional particulate and mist that was not captured by the wet gas scrubber 140. In aspects, the wet ESP 150 reduces the particulate in the low particulate flue gas 352 to less than 20 mg per normal cubic meter, such as less than 15 mg per normal cubic meter, such as less than 10 mg per normal cubic meter, such as less than 5 mg per normal cubic meter, such as 1 mg per normal cubic meter.

In aspects, the low particulate gas 352 is heated in heater 153 to avoid falling below dew point temperatures before entering the main air blower 160. The low particulate flue gas 352 is then passed through a first shut off valve 154, filter 156, and a second shutoff valve 158 and into the main air blower 160. The filter 156 may remove additional particulate from the low particulate flue gas 352 before the low particulate flue gas 352 is passed to the main air blower 160. In one aspect, the filter 156 includes activated carbon. The $CO_2$ capture-system inlet 162 receives a portion of the recycled flue gas 363 for processing by a $CO_2$ capture-system. The oxygen supply 164 provides substantially pure $O_2$ to be combined with the recycled flue gas 363 to form the regenerator inlet gas 365. The amount of oxygen supply and the amount of $CO_2$ passed to the $CO_2$ capture system may be used to control the composition and volumetric flow of the regenerator inlet gas 365. In aspects, the volumetric flow should be sufficient to fluidize the catalyst in the regenerator 120. It may also be desirable to keep the $O_2$ within a range that avoids overheating the regenerator 120, while providing sufficient $O_2$ to react with the coke in the regenerator 120.

Additional Embodiments—Section A

Embodiment 1. A method for operating a regenerator for a fluid catalytic cracking reaction system, comprising: exposing a hydrocarbonaceous feed to a catalyst in a reactor under fluid catalytic cracking conditions to form one or more gasoline products and coke associated with the catalyst; passing at least a portion of the catalyst and the associated coke into a regenerator; passing a gas comprising $CO_2$ and $O_2$ to the regenerator, wherein the $CO_2$ content in the gas is greater than 50% by vol %; combusting at least a portion of the associated coke and at least a portion of the substantially pure $O_2$ to form at least heated catalyst and flue gas; passing the flue gas to a wet gas scrubber to substantially remove $SO_x$ and cool the flue gas and form a reduced particulate flue gas; passing the reduced particulate flue gas to a wet electrostatic precipitator to form a low particulate flue gas; passing a first portion of the low particulate flue gas to a $CO_2$ capture system; passing a second portion of the low particulate flue gas to the regenerator as a recycled $CO_2$ content; passing at least a portion of the heated catalyst into the reactor.

Embodiment 2. A method for operating a regenerator for a fluid catalytic cracking reaction system, comprising: exposing a hydrocarbonaceous feed to a catalyst in a reactor under fluid catalytic cracking conditions to form one or more gasoline products and coke associated with the catalyst; passing at least a portion of the catalyst and the associated coke into a regenerator; passing a gas comprising $CO_2$ and $O_2$ to the regenerator, wherein the $CO_2$ content in the gas is greater than 50% by vol %; combusting at least a portion of the associated coke with at least a portion of the substantially pure $O_2$ to form at least heated catalyst and flue gas; passing the flue gas to a CO boiler; subsequent to the flue gas exiting the CO boiler, passing the flue gas to a wet gas scrubber to substantially remove $SO_x$ and to form a reduced particulate flue gas; passing a first portion of the reduced particulate flue gas to a recycle loop that includes a knock out drum and feeds into the CO boiler; passing a second portion of the reduced particulate flue gas to a wet electrostatic precipitator to form a low particulate flue gas; passing a first portion of the low particulate flue gas to a $CO_2$ capture system; passing a second portion of the low particulate flue gas to the regenerator as a recycled $CO_2$ content; and passing at least a portion of the heated catalyst into the reactor.

Embodiment 3. A method for operating a regenerator for a fluid catalytic cracking reaction system, comprising: exposing a hydrocarbonaceous feed to a catalyst in a reactor under fluid catalytic cracking conditions to form one or more liquid products and coke associated with the catalyst; passing at least a portion of the catalyst and the associated coke into a regenerator; passing a gas comprising $CO_2$ and $O_2$ to the regenerator, wherein the $CO_2$ content in the gas is greater than 50% by vol % and a nitrogen content is less than 20%; combusting at least a portion of the associated coke with the combustion gas to form at least heated catalyst and flue gas; passing the flue gas to a wet gas scrubber to form a reduced particulate flue gas; passing a scrubbing liquid used in the wet gas scrubber through a cooler; passing the reduced particulate flue gas to a wet electrostatic precipitator to form a low particulate flue gas; passing a first portion of the low particulate flue gas to a $CO_2$ capture system; passing a second portion of the low particulate flue gas to the regenerator as a second recycled $CO_2$ content; passing a third portion of the low particulate flue gas into a CO boiler; and passing at least a portion of the heated catalyst into the reactor.

Embodiment 4. The method as in any of the preceding embodiments, further comprising passing at least a portion of the heated catalyst into a catalyst stripper to reduce $CO_2$ prior to passing the at least the portion of the heated catalyst into the reactor.

Embodiment 5. The method as in any of the preceding embodiments, wherein the flue gas comprises less than 20% nitrogen by vol %.

Embodiment 6. The method as in any of the preceding embodiments, wherein the wet gas scrubber includes a cooler in a liquid circulation loop.

Embodiment 7. The method as in any of the preceding embodiments, wherein the reduced particulate flue gas is less than 150 degrees F. upon leaving the wet gas scrubber.

Embodiment 8. The method as in any of the preceding embodiments 1, wherein the reduced particulate flue gas comprises less than 10% $H_2O$ by vol %.

Embodiment 9. The method as in any of the preceding embodiments, wherein a two-way water seal is located downstream of the wet gas scrubber.

Embodiment 10. The method as in any of the preceding embodiments, further comprising passing the flue gas to a $NO_x$ reduction system prior to passing the flue gas to a wet gas scrubber.

Embodiment 11. The method as in any of the preceding embodiments, wherein the flue gas comprises less than 5% nitrogen by vol %.

Embodiment 12. The method as in any of the preceding embodiments, wherein the wet electrostatic precipitator is integrated with the wet gas scrubber shell.

Embodiment 13. The method as in any of the preceding embodiments, further comprising adding substantially pure $O_2$ to the recycle loop as supplemental combustion gas for the CO boiler.

Embodiment 14. The method as in any of the preceding embodiments, wherein the low particulate flue gas comprises less than 20 mg per normal cubic meter of the low particulate flue gas.

Embodiment 15. The method as in any of the preceding embodiments, further comprising passing the flue gas into the CO boiler prior to passing the flue gas to the wet scrubber.

Embodiment 16. The method as in any of the preceding embodiments, wherein the wet electrostatic precipitator removes an acid mist from the reduced particulate flue gas.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for operating a regenerator for a fluid catalytic cracking reaction system, comprising:
    exposing a hydrocarbonaceous feed to a catalyst in a reactor under fluid catalytic cracking conditions to form one or more gasoline products and coke associated with the catalyst;
    passing at least a portion of the catalyst and the associated coke into a regenerator;
    passing a gas comprising $CO_2$ and $O_2$ to the regenerator, wherein the $CO_2$ content in the gas is greater than 50% by vol %;
    combusting at least a portion of the associated coke and at least a portion of the $O_2$ to form at least heated catalyst and flue gas;
    passing the flue gas to a wet gas scrubber to substantially remove $SO_x$ and cool the flue gas and form a reduced particulate flue gas;
    passing the reduced particulate flue gas to a wet electrostatic precipitator to form a low particulate flue gas having less than 20 mg per normal cubic meter of particulate;
    passing a first portion of the low particulate flue gas to a $CO_2$ capture system;

passing a second portion of the low particulate flue gas to the regenerator as a recycled $CO_2$ content;
passing at least a portion of the heated catalyst into the reactor.

2. The method of claim 1, further comprising passing at least a portion of the heated catalyst into a catalyst stripper to reduce $CO_2$ prior to passing the at least the portion of the heated catalyst into the reactor.

3. The method of claim 1, wherein the flue gas comprises less than 20% nitrogen by vol %.

4. The method of claim 1, wherein the wet gas scrubber includes a cooler in a liquid circulation loop.

5. The method of claim 4, wherein the reduced particulate flue gas is less than 150 degrees F. upon leaving the wet gas scrubber.

6. The method of claim 1, wherein the reduced particulate flue gas comprises less than 10% $H_2O$ by vol %.

7. The method of claim 1, wherein a two-way water seal is located downstream of the wet gas scrubber.

8. A method for operating a regenerator for a fluid catalytic cracking reaction system, comprising:
exposing a hydrocarbonaceous feed to a catalyst in a reactor under fluid catalytic cracking conditions to form one or more gasoline products and coke associated with the catalyst;
passing at least a portion of the catalyst and the associated coke into a regenerator;
passing a gas comprising $CO_2$ and $O_2$ to the regenerator, wherein the $CO_2$ content in the gas is greater than 50% by vol %;
combusting at least a portion of the associated coke with at least a portion of the $O_2$ to form at least heated catalyst and flue gas;
passing the flue gas to a CO boiler;
subsequent to the flue gas exiting the CO boiler, passing the flue gas to a wet gas scrubber to substantially remove $SO_x$ and to form a reduced particulate flue gas having less than 20 mg per normal cubic meter of particulate;
passing a first portion of the reduced particulate flue gas to a recycle loop that includes a knock out drum and feeds into the CO boiler;
passing a second portion of the reduced particulate flue gas to a wet electrostatic precipitator to form a low particulate flue gas;
passing a first portion of the low particulate flue gas to a $CO_2$ capture system;
passing a second portion of the low particulate flue gas to the regenerator as a recycled $CO_2$ content; and
passing at least a portion of the heated catalyst into the reactor.

9. The method of claim 8, further comprising passing the flue gas to a NOx reduction system prior to passing the flue gas to a wet gas scrubber.

10. The method of claim 8, wherein the flue gas comprises less than 5% nitrogen by vol %.

11. The method of claim 8, wherein the wet electrostatic precipitator is integrated with the wet gas scrubber shell.

12. The method of claim 8, further comprising adding substantially pure $O_2$ to the recycle loop as supplemental combustion gas for the CO boiler.

13. The method of claim 8, wherein a two-way water seal is located downstream of the wet gas scrubber.

14. The method of claim 8, wherein the low particulate flue gas comprises less than 10 mg per normal cubic meter of particulate.

15. The method of claim 8, further comprising passing at least a portion of the heated catalyst into a catalyst stripper prior to passing the at least the portion of the heated catalyst into the reactor.

16. The method of claim 8, wherein the wet gas scrubber includes a cooler in a liquid circulation loop.

17. A method for operating a regenerator for a fluid catalytic cracking reaction system, comprising:
exposing a hydrocarbonaceous feed to a catalyst in a reactor under fluid catalytic cracking conditions to form one or more liquid products and coke associated with the catalyst;
passing at least a portion of the catalyst and the associated coke into a regenerator;
passing a combustion gas comprising $CO_2$ and $O_2$ to the regenerator, wherein the $CO_2$ content in the combustion gas is greater than 50% by vol % and a nitrogen content is less than 20%;
combusting at least a portion of the associated coke with the combustion gas to form at least heated catalyst and flue gas;
passing the flue gas to a wet gas scrubber to form a reduced particulate flue gas;
passing a scrubbing liquid used in the wet gas scrubber through a cooler;
passing the reduced particulate flue gas to a wet electrostatic precipitator to form a low particulate flue gas having less than 20 mg per normal cubic meter of particulate;
passing a first portion of the low particulate flue gas to a $CO_2$ capture system;
passing a second portion of the low particulate flue gas to the regenerator as a second recycled $CO_2$ content;
passing a third portion of the low particulate flue gas into a CO boiler; and
passing at least a portion of the heated catalyst into the reactor.

18. The method of claim 17, further comprising passing the flue gas into the CO boiler prior to passing the flue gas to the wet scrubber.

19. The method of claim 17, wherein the reduced particulate flue gas is less than 150 degrees F. upon leaving the wet gas scrubber.

20. The method of claim 17, further comprising passing the flue gas to a NOx reduction system prior to passing the flue gas to a wet gas scrubber.

21. The method of claim 17, wherein the wet electrostatic precipitator removes an acid mist from the reduced particulate flue gas.

22. The method of claim 17, further comprising passing at least a portion of the heated catalyst into a $CO_2$ stripper prior to passing the at least the portion of the heated catalyst into the reactor.

23. The method of claim 17, wherein a two-way water seal is located downstream of the wet gas scrubber.

24. The method of claim 17, wherein the wet electrostatic precipitator is integrated with the wet gas scrubber shell.

25. The method of claim 17, wherein the wet gas scrubber includes a cooler in a liquid circulation loop.

* * * * *